United States Patent [19]

Winteler et al.

[11] Patent Number: 4,571,580
[45] Date of Patent: Feb. 18, 1986

[54] SONIC TEMPERATURE WARNING DEVICE FOR LIDS OF COOKING VESSELS

[76] Inventors: Hans R. Winteler, Chemin des Granges, 1261 Arzier; Charles-Andrés Favre, Chemin Cassinette 2, 1018 Lausanne, both of Switzerland

[21] Appl. No.: 601,659

[22] Filed: Apr. 18, 1984

[30] Foreign Application Priority Data

Apr. 29, 1983 [CH] Switzerland ............... 2335/83

[51] Int. Cl.⁴ .................................. G08B 17/06
[52] U.S. Cl. .................................. 340/594; 340/584; 116/204; 99/342
[58] Field of Search ............ 340/594, 584, 589; 335/217; 99/342, 343, 344; 116/204, 216; 374/117, 141

[56] References Cited

FOREIGN PATENT DOCUMENTS 2535845  5/1984  France .................. 99/342

Primary Examiner—James L. Rowland
Assistant Examiner—Chi K. Lau
Attorney, Agent, or Firm—Ladas & Parry

[57] ABSTRACT

A movable permanent magnet (38) is moved by a rotating rig (29, 30) driven by a spiral thermometer (27). This magnet is designed to activate an interrupter (43) of an electric circuit housed in a sonic detecting-warning device (44) capable of rotating on the periphery of a housing 11. The circuit also comprises a battery (45) and a buzzer (46). When the magnet (38) rotates past the interrupter (43) it causes the interrupter to close, thereby actuating the buzzer (46). The angular position of the detector (44) is selected according to the temperature at which the warning signal is to be given.

7 Claims, 18 Drawing Figures

SONIC TEMPERATURE WARNING DEVICE FOR LIDS OF COOKING VESSELS

Sonic warning devices for lids of cooking vessels are already known in the art, which consist of a whistle adapted on the lid of the vessel and actuated by the passage of steam, when the liquid heated in the vessel reaches its boiling point and the then sudden increase in vapor pressure inside the vessel forces the vapor out through the whistle. These arrangements however have a drawback in that they only indicate the boiling temperature, and in practice it is desirable for the user to be warned when a selected temperature is reached, such as when the contents have been warmed up to 30°-40° C. and/or when their cooking temperature is reached, e.g. 95° C. for ordinary vessels or 120°-130° for the vessels commonly called pressure-cookers.

Constructions are also known (DE-OS No. 2,605,892 and U.S. Pat. No. 3,130,285) where a permanent magnet supported by a rotating element fastened to the free end of a bimetallic spiral thermometer actuates in conjunction with a second stationary magnet an electric circuit when the bimetallic spiral reaches a preselected temperature. Such a construction has the disadvantage that the actuation of the electric circuit is not very accurate in respect to the temperature, because when the two magnets interact and since one of them is borne by the bimetallic spiral, they cause a distoration of this bimetallic spiral. Such systems have yet another disadvantage. When a stop is provided, the reading remains stationary once the motion of the spiral is arrested. When no such stop is provided, the effect of the magnet disapears when the temperature is exceeded by a certain value. Also, the magnet being borne by the spiral results in an increase of the inertia of the temperature measuring system.

Another construction is known (DE-OS No. 2,909,129) where a permanent magnet is borne by the free end of a bimetallic spiral thermometer which actuates a Hall interrupter when the preselected temperature is reached. This construction has the same drawbacks as those described above, and which result from the magnet being borne by the bimetallic spiral.

The present invention is directed to a sonic temperature warning device for lids of cooking vessels which obviates the above mentioned shortcomings, and which has for object a sonic temperature warning device for lids of cooking vessels in accordance with claim 1.

The accompanying drawings illustrate by way of examples three embodiments of the device according to the invention.

Figure 1:
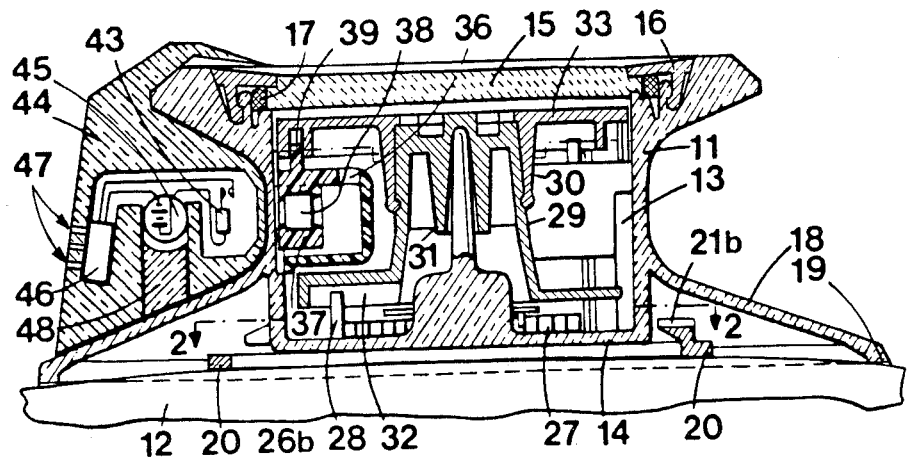
FIG. 1 is a sectional view taken axially on line 1—1 of FIG. 2 of a first embodiment of the invention before it is fastened to the lid of the vessel.
Figure 3:
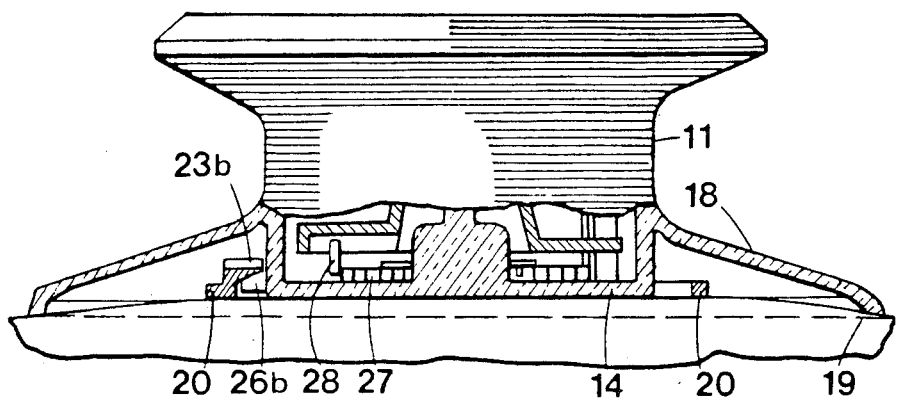
Figure 4:
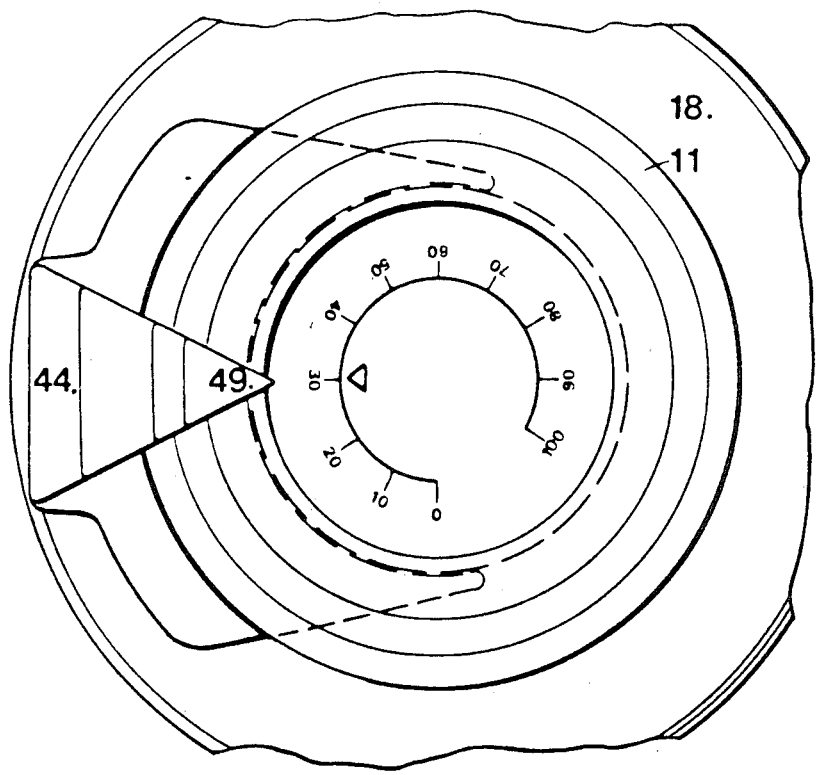
Figure 10:
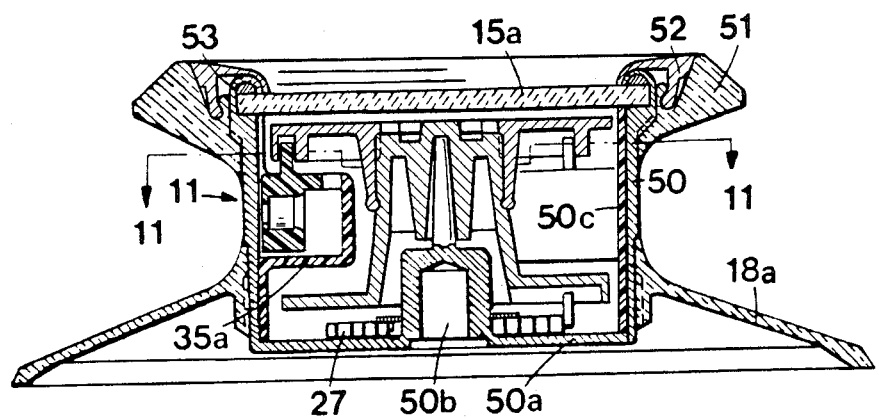
Figure 11:
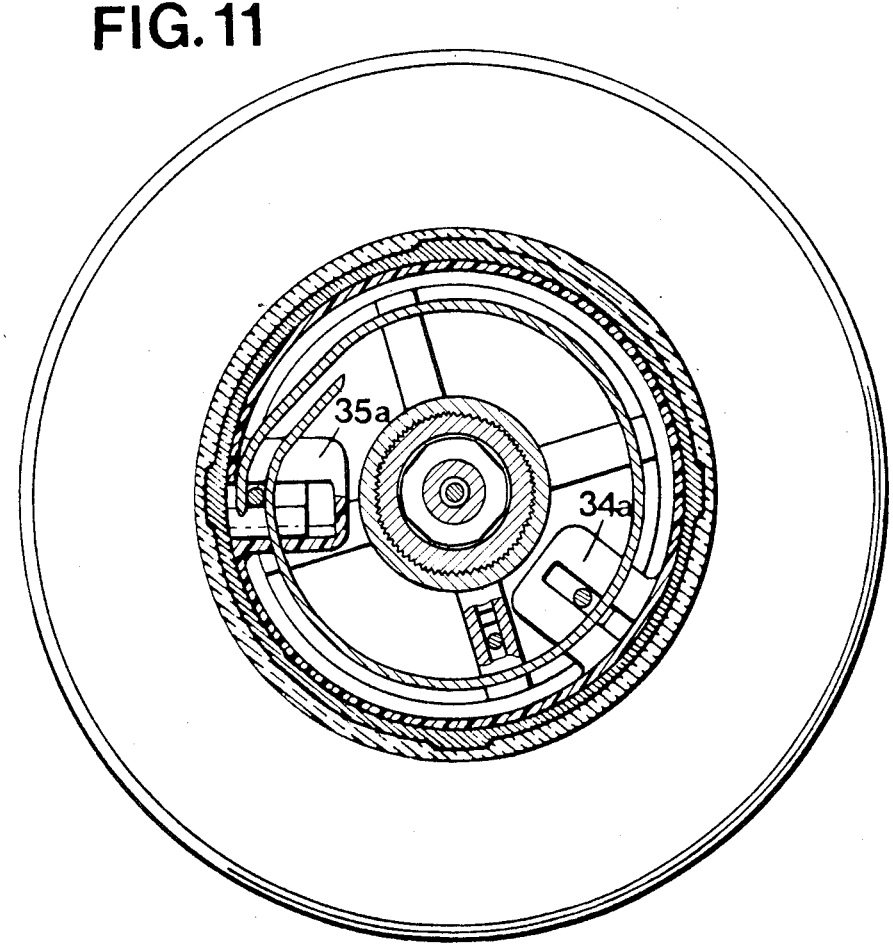
Figure 12:
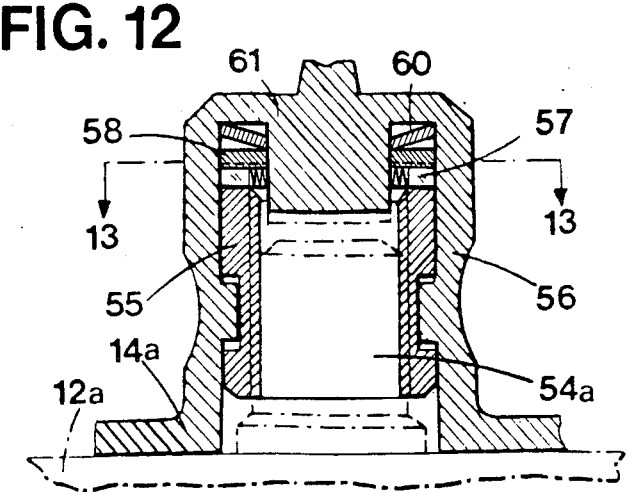
Figure 14:
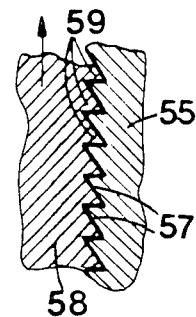
Figure 13:
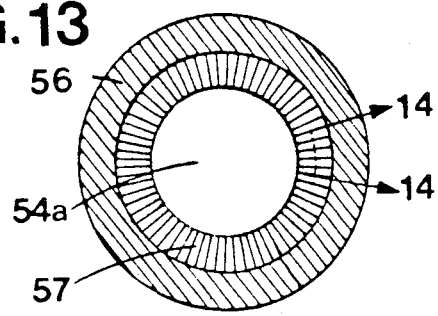
Figure 15:
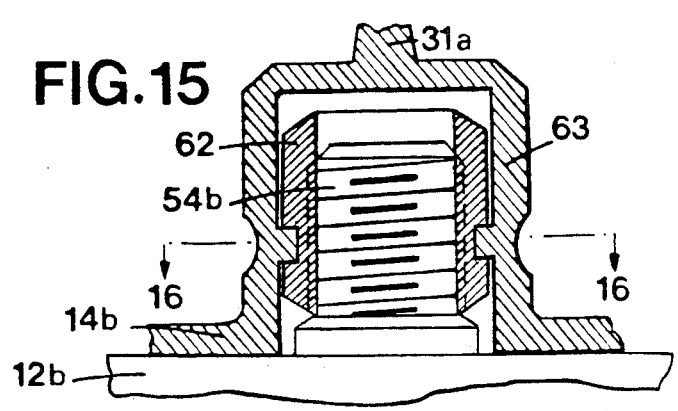
Figure 16:
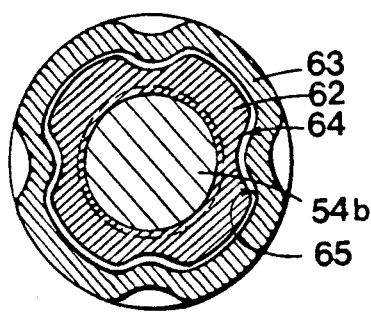
Figure 17:
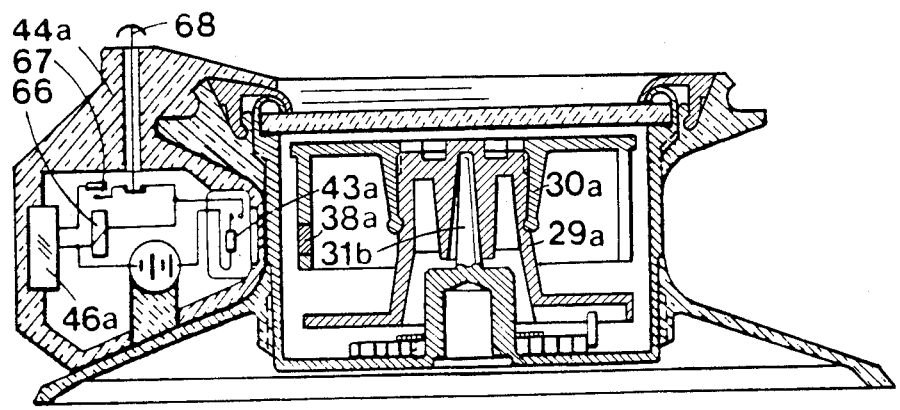
Figure 18:
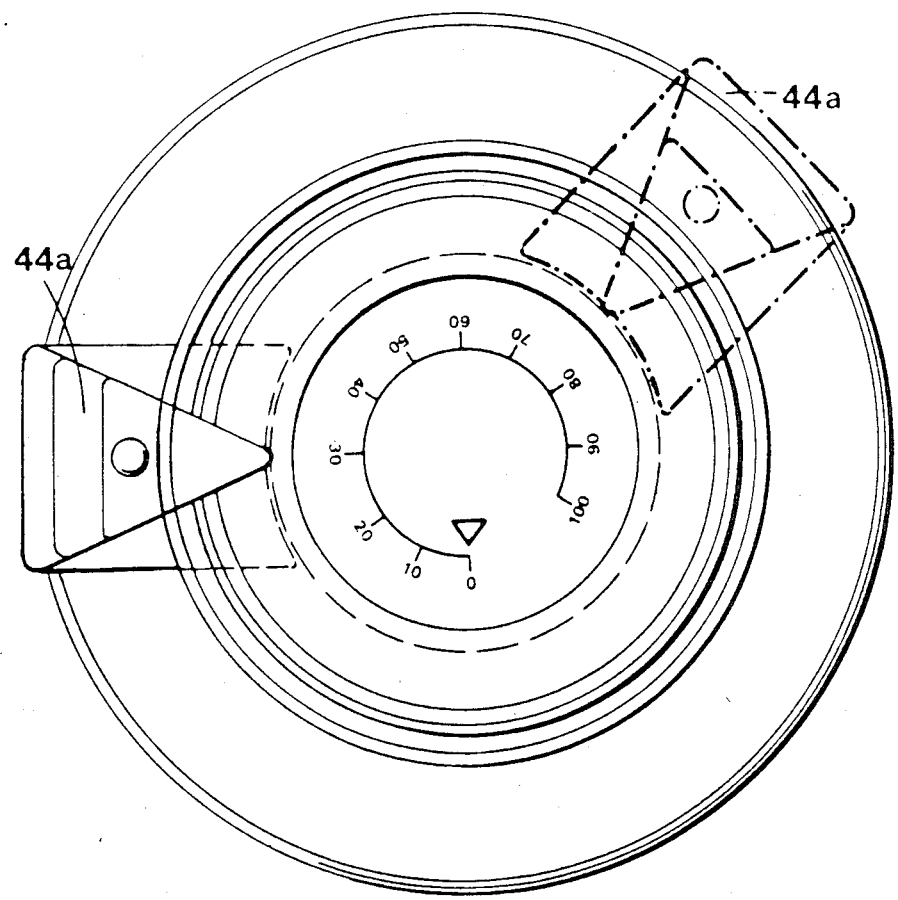

FIG. 3 is a side view partly in vertical section similar to FIG. 1 of the device once fastened to the lid of the vessel, FIG. 4 is a fragmentary plan view corresponding to FIG. 1, FIGS. 5 to 9 are schematic illustrations depicting the functioning of the first embodiment, FIG. 10 is similar to FIG. 1, but relates to a second embodiment, FIG. 11 is a sectional view taken transversely on line 11—11 of FIG. 10, FIG. 12 is an enlarged fragmentary and sectional view of the second embodiment, FIG. 13 is a sectional view taken on line 13—13 of FIG. 12, FIG. 14 is an even more enlarged fragmentary view taken on line 14—14 of FIG. 13, FIG. 15 is a view similar to FIG. 12, but relates to a variant of the second embodiment, FIG. 16 is a sectional view taken on line 16—16 of FIG. 15, FIG. 17 is a view similar to FIG. 1, but relates to a third embodiment, FIG. 18 is a plan view corresponding to FIG. 17.

The first embodiment illustrated on FIG. 1 to 4 comprises a housing 11 made of a plastic material such as polyethersulphone which is designed to be fastened to the metal lid of a cooking vessel—a section 12 of which can be seen on FIG. 1—to function both as a knob and a temperature indicator.

The chamber 13 defined by the housing 11 is closed at the bottom by a base 14 which is integral of the housing 11, and at the top by a glass 15.

This glass is fastened to the top of the housing 11 by a metal ring 16 engaged into a groove of said housing. A sealing ring 17 is pressed down by the metal ring 16 so as to seal the gap between the rim of the glass 15 and the top of the housing 11. The housing 11 further comprises a skirt 18 extending downwards with an outward inclination. To fasten the housing 11 to the lid 12, said housing is first placed at the center of said lid as illustrated on FIG. 1 with the rim 19 of the skirt 18 resting on the lid. The base 14 is at this stage situated at a short distance above the lid 12.

The following means are provided for fastening the housing 11 to the lid 12 and to provide an intimate contact between the base 14 over its integral surface and the lid 12. A stainless steel element 20, which is hexagonal in its shape when viewed from the top (FIG. 2) is welded onto the lid 12. Three sides of the element 20 at 120° each from the two others are provided with inwardly incurved portions 21a, 21b, 22a, 22b, 23a, 23b, separated by a V-shaped portion which functions as a stop. The housing 11 is provided near the base 14 with three laterally extending pairs of fingers 24a, 24b, 25a, 25b, 26a, 26b, between which the V-shaped portion is engaged.

To fasten the housing 11 on the lid 12, said housing is pressed down on said lid until the base 14 is in contact with the lid. The housing 11 is then rotated so as to engage the finger 24a, 24b, 25a, 25b, 26a, 26b against the V-shaped portions of the element 20 as illustrated on FIG. 3. This mechanism is in fact similar to a bayonet joint. The base 14 is thus strongly pressed against the lid which ensures a good heat transfer from the lid to the base. The parts 21, 22, 23, are sufficiently resilient to maintain the base 14 firmly against the lid 12. As a result of the force exerted on the base 14, this base is elastically deformed to closely adapt to the shape of the lid, which is an important feature as shall be explained further.

Figure 2:
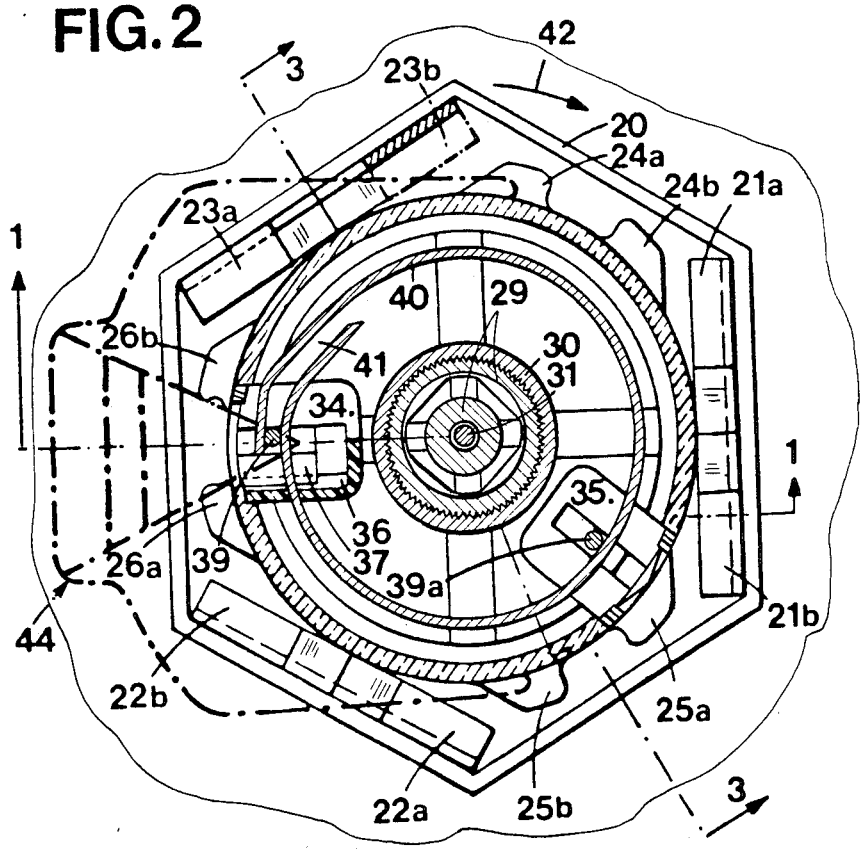
FIG. 2 is a view taken transversely on line 2—2 of FIG. 1.

While the base 14 is being brought against the lid 12, the skirt 18 remains constantly in contact with said lid by its rim 19, but deforms elastically from its original shape illustrated on FIG. 1 to that of FIG. 2. The skirt thus defines a closed chamber in which the above described fastening means are protected against water when the lid is washed.

A bimetallic spiral thermometer 27 is positioned horizontally against the inner face of the base 14. Its inner end is fastened to the housing 11 while its outer free end bears a vertical pin 28. A rotating rig comprised of two elements 29 and 30 held together by a tongue and groove system is mounted on a central pivot 31 fastened on the base 14. The pin is engaged in a radial groove 32 located on the base of the lower element 29 of the rotating rig. Hence, when the pin 28 undergoes an angular displacement due to a temperature change of the spiral thermometer 27, it causes the rig 29, 30 to rotate. The upper part 33 of the rotating rig has the shape of a disk, and is visible through the glass 15. The inner surface of the glass 15 is preferably provided with a thermometric scale while the disk 33 is provided with an index which rotates to indicate the temperature recorded by the spiral thermometer 27.

It was experimentally demonstrated, that the friction between the bimetallic spiral thermometer 27 and the plastic base 14 can be considered as negligible and does not affect to any significant extent the accuracy of the readings. It was also demonstrated that the heat transfer from the lid 12 to the thermometer 27 through the base 14 is excellent because of the intimate contact between this base and the lid. As shown on the drawings, the base 14 is advantageously thinner than the lateral wall of the housing 11. This facilitates the adaptation of the base 14 to the shape of the lid and the heat transfer through said base. The housing 11 shall be selected of a dark color, preferably black, to further improve the transfer of radiant heat.

The device of the invention further comprises means described hereafter which give a sound warning when the temperature measured by the thermometer 27 reaches a preselected value.

The inside of the housing 11 comprises two small compartments 34, 35 which are identical and disposed at an angle as shown on FIG. 2. Only the compartment 34 will be described in detail. This compartment comprises a groove 36 in which can slide radially a mobile element 37 made of a plastic material in which is embedded a small permanent magnet 38. The element 37 comprises at its upper end a pin 39 designed to cooperate with a cam 40 of the shape shown on FIG. 2. The position of the various components represented on FIG. 2 corresponds to a temperature of 30 to 40° C., i.e. to the warming up of food. At this stage, the pin 39 is engaged between two portions of the cam 40 forming an oblique groove 41. The major part of the cam 40 is circular.

The functioning of the cam 40 and of the pin 39 will be described in detail hereafter. When the rig 29, 30 rotates with the cam 40 in the direction of arrow 42 as the temperature increases, the pin 39 is displaced by the cam 40 towards the wall of the housing 11 or away from this wall. When positioned close to the wall, the magnet actuates a Reed type interrupter 43 comprising a fixed blade and a mobile blade made of a ferro-magnetic metal which are both enclosed in an air-tight capsule. When the magnet 38 is near the interrupter 43, the interrupter is closed. When the magnet is away from the interrupter 43, the interrupter is opened. This interrupter is located in a hollow provided inside a cursor 44 capable of rotating with a slight friction around the housing 11. The hollow also contains a battery 45 and a buzzer 46. The closing of the interrupter 43 actuates the buzzer which emits its sound through the orifices 47 of the cursor 44. The cursor with the components it contains forms a sonic detecting-warning device. A lid is provided for changing the battery 45.

The cursor 44 is shown on FIGS. 2 and 4 in the position when it warns the user when the temperature of 30° C. is reached. To be warned when another temperature e.g. 95° C. is reached the user has only to rotate the cursor 44 to bring its index 49 opposite the selected temperature. When this selected temperature is reached, the means located inside the compartment 35 actuate the buzzer 46.

FIGS. 5 to 9 show the cam 40 in different angular positions corresponding to various temperatures ranging from room temperature (FIG. 5) to a maximum temperature, e.g. 120° C.

Figure 5:
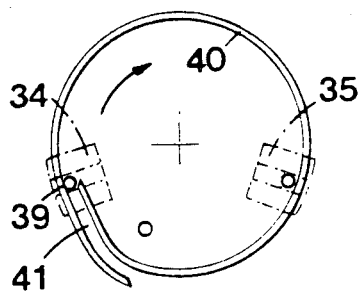

On FIG. 5, the cam is shown in its position at room temperature. The pin 39 is at the entry of the groove 41 and occupies its nearest position from the axis of the device. The magnet 38 (FIG. 1) has no effect on the interrupter 43.

Figure 6:
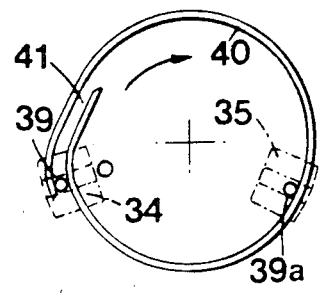
Figure 7:
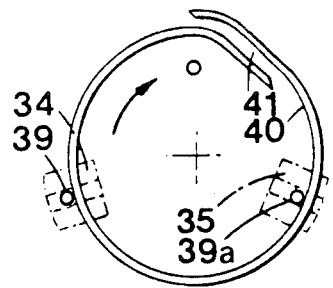
Figure 8:
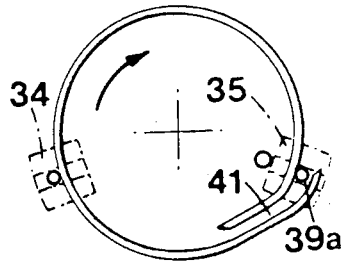
Figure 9:
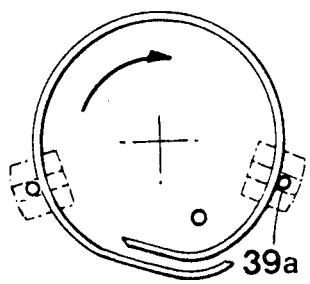

FIG. 6 shows the position of the various components when the temperature corresponding to the warming up of the vessel's contents is reached, e.g. 30° C. It can be seen that the pin 39 has followed the groove 41, and has been thereby pushed into its nearest position from the interrupter 43. Under these conditions, the magnet 38 closes the interrupter 43 and a sound is emitted by the buzzer 46. The user, warned by the signal rotated the cursor 44 from the position it occupied opposite the compartment 34 to a new position opposite the compartment 35 which corresponds to a cooking temperature, e.g. 95° C. The buzzer having ceased to emit, the temperature continues to increase inside the vessel, and the rig continues its rotation until the position illustrated on FIG. 7 is reached. In this position of the rig, the pin 39a of the compartment 35 is on the inner side of the cam 40 while the pin 39 is on the outer side of said cam and occupies its nearest position from the axis of rotation. The rig continues to rotate as temperature increases and the pin 39 arrives at the entrance of the groove 41 and is moved into the position illustrated on FIG. 8 which is the most distant from the axis of rotation and the nearest to the interrupter 43. The buzzer then begins to emit to warn that the maximum temperature is reached. If the temperature continues to increase, e.g. to 120° C. the various components assume the position shown on FIG. 9, where the buzzer continues to emit. When the user stops the heating, the cam rotates in the direction opposite the arrows and resumes progressively the position initially occupied in FIG. 5.

It can be seen from the preceding description that the device of the invention gives a sound signal when the temperature of the vessel reaches one or the other of two preselected values corresponding to the angular position of the compartments 34 and 35.

The embodiment illustrated on FIGS. 10 and 11 differs from the previous embodiment by certain features which will be described in detail hereafter. The components which remain identical will not be described.

In this second embodiment, the housing comprises a metal box 50 into which are fastened by a tongue and groove system on the one hand a skirt 18a similar to 18 and on the other hand an upper ring 51 made of a plastic material and into which a metal ring 52 is fastened by a tongue and groove system after having bent around the upper end 53 of the metal box 50 as illustrated on FIG. 10. This upper end 53 holds in position a glass 15a similar to 15. Sealing means—not illustrated—are also provided to seal the gap between the glass 15a and the box 50. In this embodiment, the means for fastening the housing 11 to the lid—not illustrated on FIGS. 10 and 11—are different from those described in the first embodiment.

The base 50a of the box 50 is provided with a centrally located recess 50b in which are housed means for fastening the device to the lid of the vessel. The means can be for example those described with reference to FIGS. 12-14 or 15-16. This embodiment further differs from the first embodiment in that the compartments 34 and 35 in which were mounted the small magnets capable of sliding, are not fastened to the housing 11 but to a cylindrical body 50c housed inside the box 50 between the base 50a and the glass 15a. The compartments 34 and 35 of the first embodiment are indicated in FIGS. 10-11 by the numerals 34a and 35a. It will be noted that the base 50a is thinner than the cylindrical wall of the box 50 to allow for the deformation of said base when the device is pressed on the lid: it is necessary for the base 50a to adapt exactly to the shape of the lid to ensure a proper heat transfer to the spiral thermometer 27a which is positioned against the inner face of this base.

FIGS. 12-14 illustrate such a fastening means which is further provided with safety means consisting of a torque limiting device. The housing is here of the same type as the housing of FIG. 1, with however some differences which will be mentioned.

As can be seen on FIG. 12 the device is fastened by a threaded rod 54a welded to the lid 12a. A nut 55 is engaged on the threaded rod 54a. This nut is housed inside a centrally located recess 58 which is integral of the base 14a of a housing such as 11. Torque limiting means are provided between the recess 56 and the nut 55; these means comprise a serrated area 57 located on the upper face of the nut 55. Each serration has a radial face and an oblique face as can be seen on FIG. 14. The torque limiting means also comprise a washer 58 positioned to face the serrated area 57 of the nut 55 with a serrated area 59, where each serration also has a radial face and an oblique face as shown on FIG. 14. A washer 60 acting as a compression spring is placed between the bottom 61 of the recess 56 and the serrated washer 58. The torque limiting means function as follows: when the threaded rod 54a is screwed inside the nut 55 for the purpose of fastening the housing on the lid, the washer 60 acting as a spring maintains the serrated areas 57 and 59 engaged for rotation. When the preselected limit torque value is reached, the washer 60 gives in and the serrated area 57 ceases to be engaged with the serrated area 59 and slips on it. Quite obviously, the washer 58 is fastened inside the recess 56 of the housing so that it cannot rotate.

In the variant shown on FIGS. 15 and 16, the threaded rod 54b is welded on the lid 12b and screwed inside the nut 62. This nut is located inside a centrally positioned recess 63 integral of the base 14b of the housing. The top of the recess 63 is provided with a pivot 31a similar to the pivot 31 of FIG. 1. The vertical wall of the nut 63 is corrugated, as shown in an exaggerated manner on FIG. 16. The inner surface 65 of the recess 63 is identically corrugated. Accordingly, when the housing is rotated to fasten it on the lid, the nut 62 does not rotate until a limit torque value is reached. If this value is exceeded and if the housing is further rotated, the corrugations 65 of the recess 63—which are made of a plastic material—deform elastically and the nut begins to slip inside the recess 63.

This arrangement is a torque limiting device which prevents the housing and the lid from being damaged in the case of the nut 62 being screwed forcibly on the threaded rod 54b.

In the third embodiment of the invention illustrated on FIG. 17, the housing is identical to that of FIG. 10. The description of the third embodiment will be limited to those components in which the third embodiment differs from the two previous ones.

The rig comprises as in FIG. 1 two elements 29a, 30a inserted one into the other and rotating on a pivot 31b. However, the element 30a is not provided with a cam such as cam 40 of FIG. 2. Furthermore, there are no compartments 34 and 35 in which a magnet 38 is installed for radial displacement. A small permanent magnet 38a is embedded in the cylindrical wall of the element 30a and therefor rotates with the rig.

A cursor 44a having the same general shape as the cursor 44 of FIG. 1 is mounted on the housing so as to rotate around its periphery. In the hollow space provided inside the cursor 44a is an interrupter of the Reed type 43a which closes when the magnet 38a is in radial alignment with it. The hollow space further contains a buzzer 45a which is actuated by the interrupter 43a, but in a different manner from the previous embodiments. A relay 66 is energized on the closing of the interrupter 43a. This relay closes the interrupter 67 and thereby is kept energized, after the magnet 38a has rotated away from the position it occupied opposite the interrupter 43a. Under these circumstances when a temperature selected by positioning the cursor 44a—e.g. 30° C. in FIG. 18—is reached, the magnet 38a actuates the interrupter 43a, the relay 66 is then energized and the buzzer 46a begins to emit. Because of the relay 66 the buzzer continues to emit, even if the temperature continues to encrease and after the magnet 38a has rotated away from the cursor 44a. The user is therefor warned that the warning period is terminated. To stop the buzzer, he only has to press down the button 68 which causes the opening of the energizing circuit of relay 66. If the user wants to be further warned of when another temperature is reached, for example 75° C., he only needs to rotate the cursor 44a to bring it into the position represented by ghost lines on FIG. 18. The buzzer 46a will emit again when the temperature of 75° C. is reached. In this embodiment, the buzzer can be made to emit at any temperature selected by the operator.

We claim:

1. A sonic temperature warning device for lids of cooking vessels comprising a housing (11) which functions as a lid knob, means for fastening this housing to a lid (12), a bimetallic spiral thermometer (27) located in the housing for actuating a temperature indicator borne on a rotating rig (29, 30) mounted on a pivot of said housing, and at least one permanent magnet (38) capable of moving in the housing (11) according to the angular position of the rotating rig (29,30), which position is dependent on the temperature measured by the thermometric element (27), characterized in that each permanent magnet (38) is mechanically independent from the bimetallic spiral thermometer (27) and is capable of radial displacement in the housing (11) according to the angular position of the rotating rig, (29, 30) which position is dependent on the temperature measured by the thermometric element (27), in that it comprises at least one sonic detecting-warning device (44), which is actuated by the radial displacement of said magnet (38), in that it comprises a power source (45), a sound emitting device (46) and an electrical interrupter (43) mounted in the same circuit as the power source (45) and the sound emitting device (46), said interrupter comprising a mobile blade made of a ferro-magnetic material actuated by the magnet (38) when said magnet is located at a preselected radial distance from said blade, and in that the sonic detecting-warning device (44) is provided with means for adapting it on the periphery of the housing (11) in such a manner that the sonic detecting-warning device (44) will emit a sound signal when the magnet (38) is located at least temporarily at a preselected distance from said device.

2. A device according to claim 1, characterized in that the magnet (38) is borne by an element (37) mounted on a radial guide (36) integral of the housing (11), in that the rotating rig (29, 30) is provided with a cam (40) cooperating with the element (37) bearing the magnet to vary the distance between said element (37) and the wall of the housing (11) according to the angular position of said rig (29, 30), which position is dependent on the temperature measured by the thermometric element (27), the sonic detecting-warning device (44) being placed opposite the radial guide (36).

3. A device according to claim 1, characterized in that the magnet (38a) is borne by the rotating rig (29a, 30a) for rotation with said rig and in that a sound signal is emitted when the magnet (38a) rotates past the sonic detecting-warning device (44a) which had previously been positioned according to the temperature selected for the signal.

4. A device according to claim 3, characterized in that the detecting-warning device (44a) comprises means (66, 67) for maintaining the sound signal even after the magnet (38a) has rotated away from the location of the detecting-warning device (44a) and an interrupter (65) with which the user can stop said signal at will.

5. A device according to claim 3, characterized in that the sonic detecting-warning device (44) comprises means for removably attaching said device to the periphery of the housing (11) and that the said device can be rotated as desired on said periphery.

6. A device according to claim 1, characterized in that it comprises two sonic detecting-warning devices (44) for warning that one of two selected different temperatures is reached.

7. A device according to claim 2, characterized in that the cam (40) is of a generally circular shape and is provided with a groove (41) which is used to control the movement of two magnets bearing elements (39, 39a).

* * * * *